US005950987A

United States Patent [19]
Kaneko

[11] Patent Number: 5,950,987
[45] Date of Patent: Sep. 14, 1999

[54] IN-LINE LEVER ACTUATED VALVE

[75] Inventor: Yutaka Kaneko, Wheeling, Ill.

[73] Assignee: Tetra Laval Holdings & Finance, SA, Pully, Switzerland

[21] Appl. No.: 08/870,170

[22] Filed: Jun. 6, 1997

[51] Int. Cl.[6] .................................................. F16K 1/16
[52] U.S. Cl. ........................................ 251/303; 251/335.1
[58] Field of Search ......................... 251/303, 58, 335.1, 251/335.2

[56] References Cited

U.S. PATENT DOCUMENTS

| | | |
|---|---|---|
| 1,879,205 | 9/1932 | Gunn . |
| 2,257,199 | 9/1941 | Sloan . |
| 2,271,715 | 3/1942 | Saffell et al. . |
| 2,912,012 | 11/1959 | Klingler ............................ 251/335.1 X |
| 2,924,233 | 2/1960 | Michaels ........................... 251/335.1 X |
| 2,927,601 | 3/1960 | Martin et al. ....................... 251/303 X |
| 2,969,809 | 1/1961 | Klingler ............................ 251/335.1 X |
| 2,989,283 | 6/1961 | Klingler ............................ 251/335.1 X |
| 3,023,769 | 5/1962 | Williams ........................... 251/335.1 X |
| 3,191,962 | 6/1965 | Finlayson .............................. 251/303 X |
| 3,268,202 | 8/1966 | Murray et al. ........................... 251/303 |
| 3,323,692 | 6/1967 | Cook ................................... 251/303 X |
| 3,372,841 | 3/1968 | Olson .................................. 251/303 X |
| 3,525,359 | 8/1970 | Short, III ............................. 251/303 X |
| 3,685,794 | 8/1972 | Henning . |
| 3,757,726 | 9/1973 | Moeller . |
| 3,875,921 | 4/1975 | Deboy et al. ......................... 251/303 X |
| 3,955,596 | 5/1976 | Diaz . |
| 3,959,827 | 6/1976 | Kaster . |
| 4,299,373 | 11/1981 | Troyer ........................................ 251/58 |
| 4,462,422 | 7/1984 | Owoc et al. ...................... 251/335.1 X |
| 4,504,266 | 3/1985 | Harle . |
| 5,078,180 | 1/1992 | Collins .................................. 251/58 X |
| 5,213,237 | 5/1993 | Armstrong ........................ 251/335.1 X |
| 5,534,330 | 7/1996 | Hanson et al. . |
| 5,620,015 | 4/1997 | Gribble et al. ....................... 251/303 X |

*Primary Examiner*—John Rivell
*Assistant Examiner*—Meredith H. Schoenfeld
*Attorney, Agent, or Firm*—Welsh, Katz, Ltd

[57] ABSTRACT

An in-line, lever actuated valve for use in a liquid filling apparatus includes a valve body having an outer surface and defining an inlet region, an outlet region and a flow chamber intermediate the inlet and outlet regions. The valve body defines a cone opening in a side wall of the valve intermediate the inlet and outlet regions. A pivotable cone member having a plunger, a lever arm and a cone shield intermediate the plunger and lever arm, is positioned with at least a portion of the cone member traversing through the cone opening and positioned within the flow chamber. The cone shield engages the outer surface of the valve body to form a seal therewith. The cone member is pivotable through an angle of about 20° from an opened position to a closed position wherein the plunger forms a seal across the flow chamber. The cone shield is positioned on the lever so as to define a base angle that is about one-half of the angle that the valve cone pivots from the closed position to the opened position.

24 Claims, 11 Drawing Sheets

IN-LINE LEVER ACTUATED VALVE

FIELD OF THE INVENTION

This invention relates to an in-line lever actuated valve. More particularly, the invention relates to an in-line lever actuated universal product valve (UPV) having an angled cone shield, and a supporting device therefor.

BACKGROUND OF THE INVENTION

Liquid filling apparatuses are well known in the art. They are in widespread use for, for example, filling containers for storage of milk, juice and the like. Many of the processes in such filling apparatuses are carried out in an automated manner. That is, the containers are erected and positioned within a filling area, the containers are filled, and the containers are then sealed by automatic operation of the apparatus.

In an effort to reduce the contamination of food product, and to provide product having a relatively extended shelf life, many such filling apparatuses operate in hygienically clean or aseptic environments. The equipment used in such hygienic processes must be maintained and operated in a clean, hygienically approved condition.

These liquid filling apparatuses have also undergone improvements relative to the speed at which they operate. Such apparatuses are known to package up to about sixty (60) one-liter containers per minute. The combination of strict cleanliness and operating speed can put extreme constraints on the equipment and materials of construction. In particular, the moving parts of the apparatus that come into contact with the liquid food product, and more particularly, the non-metallic components, can be subjected to high stresses.

One particular portion of the apparatus, the filling valve, can be subjected to localized high stresses and can require frequent maintenance and repair. The soft, flexible, non-metallic, moving portions of the valve, such as the valve cone, can require frequent repair or replacement. The valve cone is that portion of the valve that forms a seal against the harder, typically steel valve seat.

In a common configuration, the cone is formed of a high grade silicone or like material that can be made to governmental (e.g., FDA) or industry hygienic standards. The cone is actuated by a stem that extends into the valve body from about an end thereof, and connects to the cone at about the top of the cone. As the cone is moved from the closed position to the open position, it is pivoted downwardly in an arcuate motion by the stem, into the valve body, toward a side wall of the valve. When in the open position, the valve cone rests near the side wall, which reduces the amount of space available for maintaining and cleaning the valve. Such reduced maintenance space can increase both the time and the cost associated with equipment maintenance.

In addition, in such known valves, the cone portion that comes into contact with the liquid food, is sealed from the environs by a cone shield. The cone shield is a flat, planar member mounted to, and surrounding the stem. In a known apparatus, the shield is mounted perpendicular to the longitudinal axis of the stem. The cone serves as a sealing element, and is formed of the same material as the cone (e.g., high grade silicone) in the event that it comes into contact with the liquid food product.

The shield rests against an outer surface of the valve body. As the valve cone pivots between the opened and closed positions, the shield flexes to remain in contact with the valve body, while accommodating the pivoting stem. As such, the shield can be subjected to high localized stresses, and because of the nature of the material, can fail due to fatigue of the material. In particular, failure has been observed in the region of the shield adjacent to the stem. Fatigue failure has been noted to increase with an increase in the angle or distance that the valve cone pivots.

Moreover, because of the "top-entry" nature of known valves, it has been necessary to use differently designed valves for each the inlet and outlet sides of the filling pump. This is principally due to the interference that the top-entry assembly causes with the food product flowing from the pump discharge. Furthermore, because the actuator is of the top-entry design, flow resistance increases across the valve, which, in order to be overcome, requires significantly oversized interconnecting piping and components.

Accordingly, there continues to be a need for a hygienic in-line valve for a liquid filling apparatus, which valve has a side entry configuration. Such a valve reduces the wear, fatigue and eventual failure of the non-metallic, resilient sealing components, such as the cone shield, and facilitates internal valve cleaning and maintenance. Such an in-line valve further reduces flow resistance across the valve, thereby allowing the use of an overall smaller profile valve having correspondingly smaller valve components to achieve the desired flow characteristics. Advantageously, such a valve can be used in either or both the inlet valve position and the outlet valve position relative to the filling pump.

SUMMARY OF THE INVENTION

An in-line, lever actuated valve for use in a liquid filling apparatus includes a valve body having an outer surface and defining an inlet region, an outlet region and a flow chamber intermediate the inlet and outlet regions. The valve body defines a cone opening therein intermediate the inlet and outlet regions.

The valve includes a novel pivotable cone member having a plunger, a lever arm and a cone shield intermediate the plunger and lever arm. The cone member is positioned in the valve with a portion thereof traversing through the cone opening to position the plunger within the flow chamber. The cone shield engages the outer surface of the valve body to form a seal therewith.

The cone member, which enters through the side of the valve body, is pivotable through a predetermined angle between an opened position and a closed position wherein the plunger forms a seal across the flow chamber.

Advantageously, the present lever actuated valve overcomes the problems noted above by providing a small or short profile valve positionable in the filling apparatus that includes a large flow area relative to the adjacent piping, upon opening of the valve. The present configuration provides ready access to the internal areas of the valve to perform maintenance and cleaning of the valve. In addition, the present valve, having a side entry lever arm, permits the use of the valve at both the inlet and outlet sides of the filling apparatus pump.

The cone member can be formed of a resilient material, such as FDA approved silicone rubber. Preferably, the cone shield and plunger are integral with one another, and have a sleeve portion extending therebetween.

In a preferred embodiment, the lever arm defines a longitudinal axis, and the cone shield is positioned about the lever arm so as to define an acute base angle relative to a plane that is perpendicular to the longitudinal axis. Unlike known valve shields which are perpendicular to the lever arm axis, the present angled cone shield reduces the amount of angular flexing of the shield relative to the relaxed state or position thereof. Consequently, the amount of stress that the shield is subject to due to cycling is significantly reduced and the above noted problems associated with fatigue failure of the cone at the flexure points are reduced.

Most preferably, the valve cone is pivotable through an angle of about 1° to about 25° from the closed position to the opened position, and the cone shield base angle is about one-half of the angle that the valve cone pivots. In one arrangement the valve cone pivots about 20° and the cone shield base angle is about 10°.

The cone member can be mounted to the lever arm so as to define a gap between the cone shield and the lever arm at about a juncture of the sleeve portion and the cone shield. Preferably, the gap is formed as a countersunk region to accommodate a portion of the cone shield as the cone shield flexes when the cone member is pivoted between the opened and closed positions. The countersunk region reduces the compression of the material as the cone pivots.

An actuator and actuator support can be fitted to the valve. The actuator support is fixedly mounted to the valve body, and the actuator is operably connected to the cone portion to pivot the cone portion between the opened and closed positions. The actuator support includes a pivot block pivotally mounted to the actuator support. The pivot block defines a clamping bore therein for receiving and clamping the lever arm.

In one embodiment, the pivot block includes a novel arrangement including at least one molded-in nut. The nut, which can be a common hexagonal nut is positioned to receive a bolt to secure the lever arm in the pivot block. The pivot block can include recesses therein for receiving the bolt head to provide a flush mount of the bolt. The pivot block and cone shield, which abut one another when the valve is assembled, can include complementary grooves or channels to accommodate a sealing element, such as an O-ring, between the shield and the pivot block, to form a seal therebetween.

Advantageously, the present in-line valve provides an arrangement that can be used at either the inlet or the outlet positions of the filling pump. The valve has a short profile, and is configured to reduce flow resistance while maintaining the desired flow characteristics of the apparatus. Moreover, the present valve configuration provides increased access to the valve internal areas, which reduces the time and cost of valve maintenance.

Other features and advantages of the present invention will be apparent from the following detailed description, the accompanying drawings, and the appended claims.

DETAILED DESCRIPTION OF THE PREFERRED EMBODIMENTS

Figure 1:
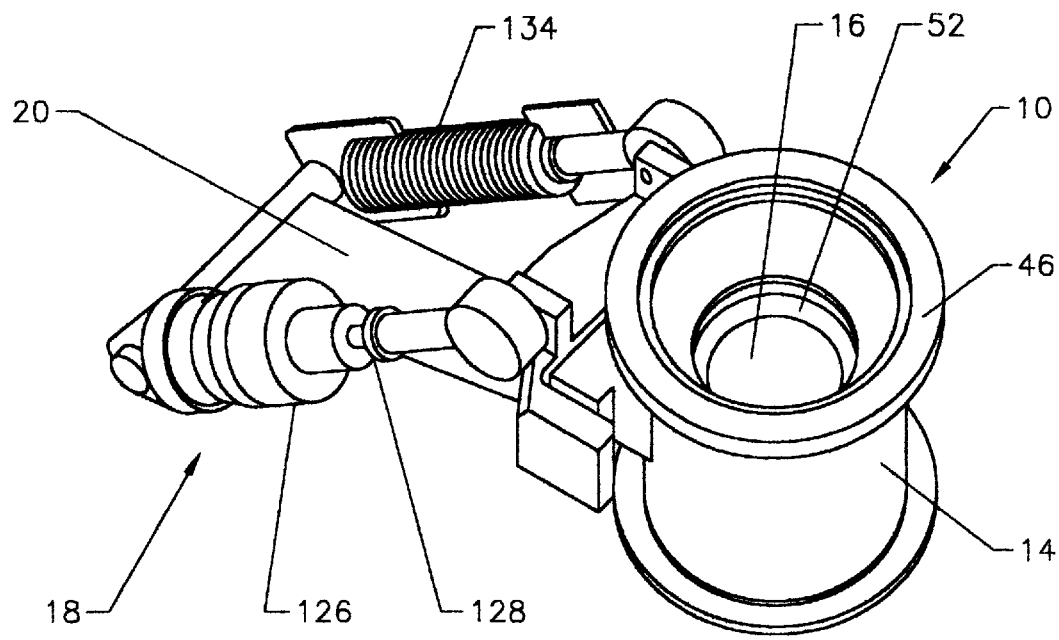
FIG. 1 is a front perspective view of an in-line lever actuated universal product valve (UPV), including the valve actuator and support assembly, embodying the principles of the present invention.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Referring now to the figures, and in particular to FIGS. 1 and 3–5, there is shown an in-line lever actuated valve 10 in accordance with the present invention. The valve 10, which in FIG. 2 is shown installed at various locations in a liquid filling apparatus 12, includes a valve body 14, a cone portion 16, an actuator 18 and an actuator support assembly 20. In one use, as illustrated in FIG. 2, the valve is used as a universal product valve (referred to as a "UPV").

In use, the UPV 10 is positioned at the inlet and outlet of a product or filling pump 22 in the filling apparatus 12. The apparatus 12 includes, generally, a liquid reservoir 24, the pump 22, inlet and outlet valves 26, 28, respectively, and a filling tube and nozzle 30 associated with each filling train. The reservoir 24 can be configured to provide liquid feed to a pair of trains, as illustrated in FIG. 2.

The valve 10 is configured to initiate and terminate flow between the reservoir 24 and the pump 22 when installed as an inlet valve 26, and between the pump 22 and the filling nozzles 30 when installed as an outlet valve 28. Advantageously, the present valve 10 has a smaller profile than known valves and thus requires less space between components for installation. In addition, because the valve cone 16 penetrates the valve body 14 from a side 32 of the valve body 14 (e.g., a side-entry valve cone, which will be discussed in more detail herein), the same valve can be used at both the pump 22 inlet and outlet positions. Unlike known filling apparatuses (which use a top-entry valve) in which the inlet and outlet valves have different configurations, the present arrangement reduces the quantity of replacement and spare parts that must be maintained in stock by a user. Use of the same valve 10 at both the pump 22 inlet and outlet positions also reduces the cost to manufacture and maintain the filling apparatus 12. In addition, the shorter or smaller valve profile results in less material cost and thus reduced overall costs for the apparatus.

The valve body 14 is a cylindrical flow section defining an inlet region 34 and an outlet region 36. Inlet and outlet mounting flanges 38, 40, respectively, are formed in the body 14 at the inlet and outlet regions 34, 36, respectively, for mounting the valve 10 in the liquid flow path (e.g., within the flow trains) of the apparatus 12. The mounting flanges 38, 40 have grooves 42 formed therein for receiving an O-ring 44 or the like, to seal the valve 10 to adjacent components of the apparatus 12. In a typical arrangement, the valve body 14 is mounted to the apparatus 12 by dairy clamps 46, such as that shown in FIG. 5, that clamp the valve 10 and adjacent piping sections or components to one another.

The body 14 also includes support mounts 48 for mounting the actuator support assembly 20 to the valve body 14. As illustrated, the support mounts 48 extend outwardly from the valve body 14. The body 14 defines a cone opening 50 or cone penetration intermediate the inlet and outlet flanges 38, 40, positioned between the support mounts 48.

Figure 3:
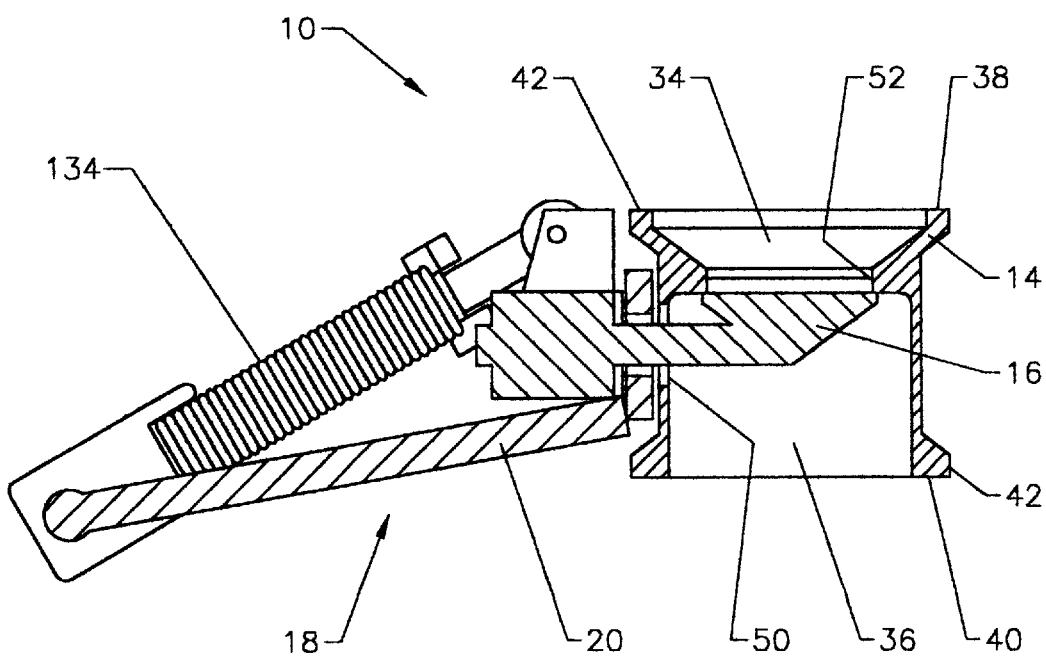
FIG. 3 is a partial cross-sectional view of the UPV, including the actuator and the actuator support of FIG. 1, the valve being shown in the closed position.

The body 14 defines a throat area 52 and a valve seat 54. The valve seat 54 is that portion of the valve 10 that is sealed when the valve 10 is in the closed position as shown in FIG. 3. In a present embodiment, the seat 54 is a flat surface that is engaged by the valve cone 16 to terminate flow through the valve 10, rather than the known, pointed or raised seating surfaces. Advantageously, the present flat valve seat 54 reduces the amount of wear on the valve cone 16.

Known valve seats typically have a raised or pointed seating surface that engages the valve cone portion. Because the cone portion is formed of a resilient, rubber or rubber-like material, the cone material tends to wear as it is continuously compressed against the pointed seating surface. This continuous and repetitive compression of the soft valve cone against the raised valve seat can cause wear of the soft cone portion or can crease or indent the cone portion. Such creasing or indenting of the cone can reduce the ability of the cone to seal against the seat and can produce a crevice in the cone that is difficult to clean.

Figure 4:
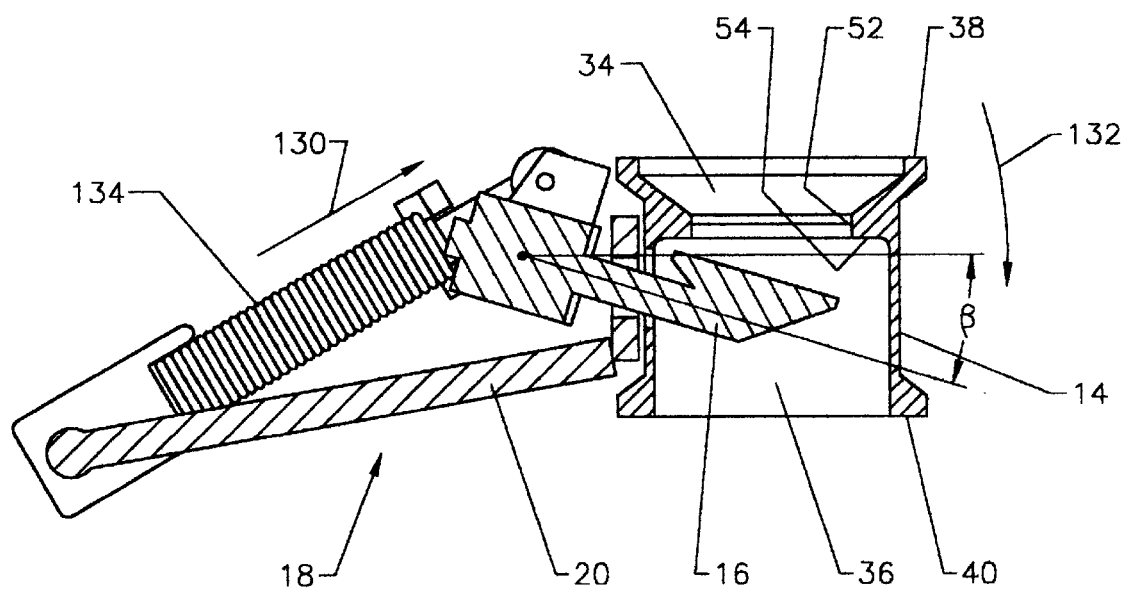
FIG. 4 is a partial cross-sectional view of the UPV of FIG. 3, with the valve being shown in the open position.

As shown in FIGS. 3 and 4, which illustrate the valve 10 in the closed and opened positions, respectively, the cone portion 16 is adapted to pivot a predetermined angle $\beta$ relative to the valve body 14. The cone portion 16, which is shown in detail in FIGS. 9–12, includes a plunger 60, a cone shield 62 and a cone support 64 having a lever arm 66 extending from about the plunger 60. As provided previously, the plunger 60 and cone shield 62 are formed of a soft, resilient, rubber or like material. In a current embodiment, the resilient portion, generally shown at 58, of the cone 16 is formed of a high grade silicone rubber that meets governmental, e.g., FDA, and industry standards.

The lever arm 66 extends generally transversely from a centerline or axis, indicated at 68, of the plunger 60. This is in contrast to known lever arms that connect to the plunger at the top or bottom of the plunger. The present arrangement provides direct action of the plunger 60, and reduces the flow resistance across the valve 10 by reducing interference with liquid flowing through the valve 10, across the plunger 60. The cone portion 16 pivots between the closed and opened positions by direct action of the lever arm 66.

The plunger 60 includes a sealing surface or a sealing edge 70 at an upper region thereof. The sealing surface 70 is adapted to abut and engage the flat valve seat 54, when the valve 10 is in the closed position, to terminate flow through the valve 10. Unlike known valves, in which a sealing edge is positioned on the metallic valve seat, and the flat, resilient plunger contacts the metal edge, the present sealing configuration, which can include a resilient sealing edge 70 on the plunger 60, engages a flat, metallic seat 54, which reduces the opportunity for wear of, and damage to, the softer plunger portion 60.

Figure 9:
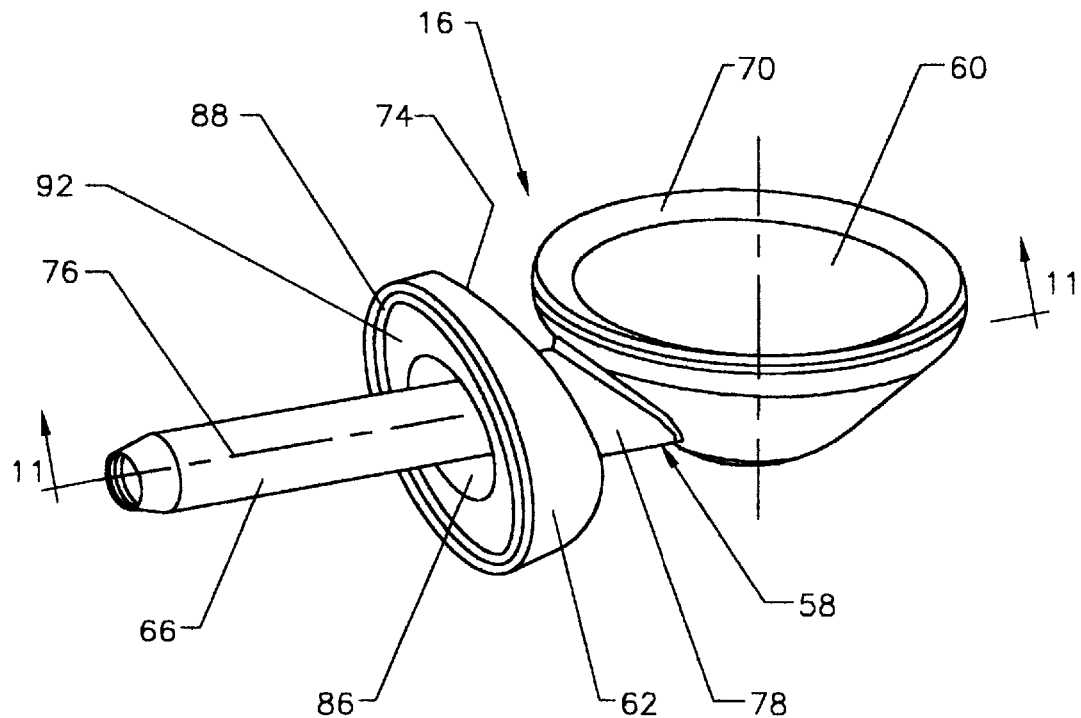
FIG. 9 is a perspective view of one embodiment of a valve cone having an angled cone shield, including a groove formed therein for receiving an O-ring.
Figure 10:
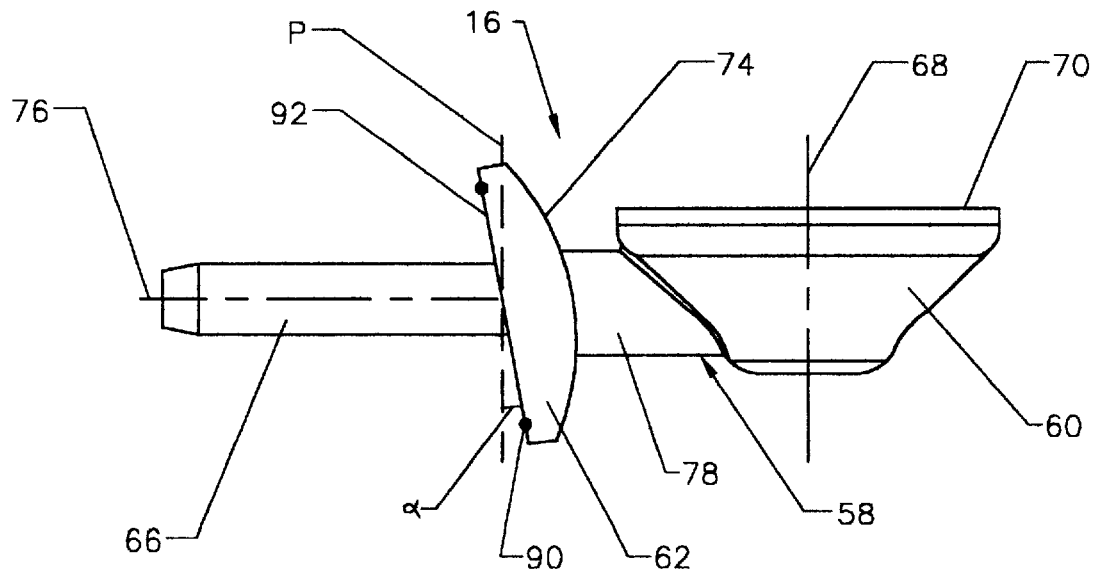
FIG. 10 is a side view of the valve cone of FIG. 9.
Figure 11:
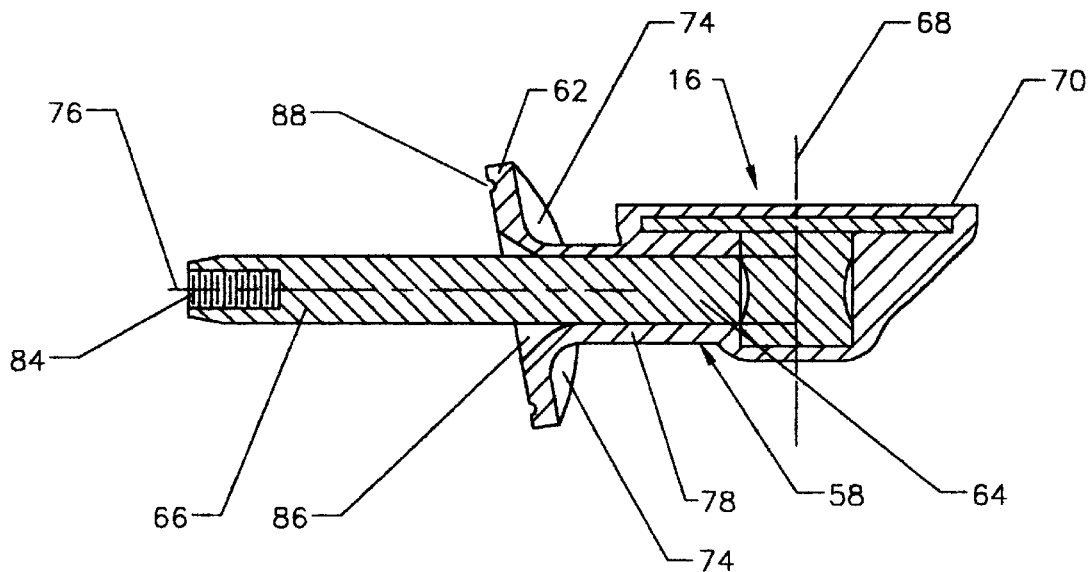
FIG. 11 is a cross-sectional view of the angled cone shield taken along line 11—11 of FIG. 9, the cone being shown with a lever arm having a threaded opening for accommodating a leak detection element.
Figure 12A:
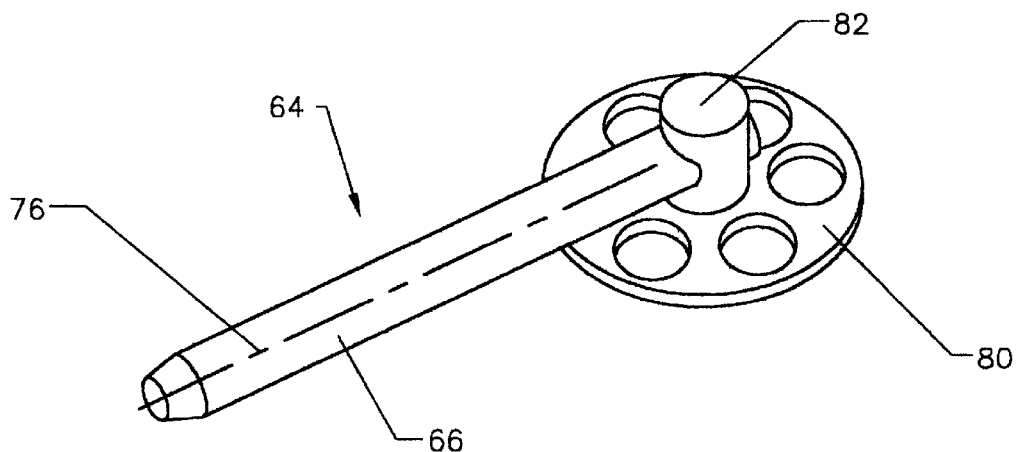
FIGS. 12A–12D illustrate the valve cone support and lever arm of FIGS. 9–11.
Figure 12B:
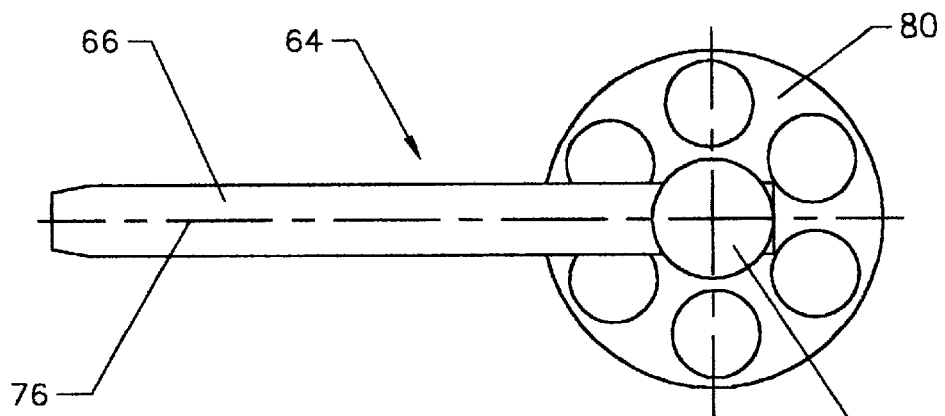
Figure 12C:
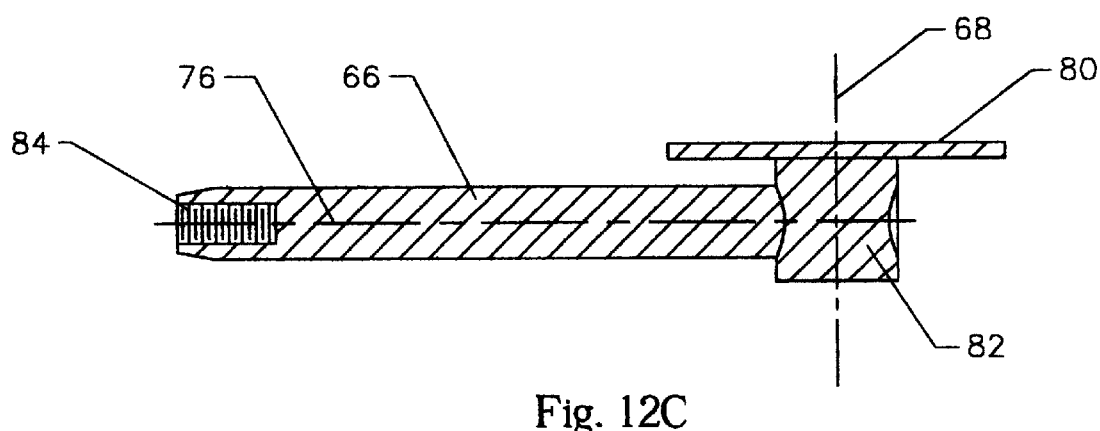
Figure 12D:
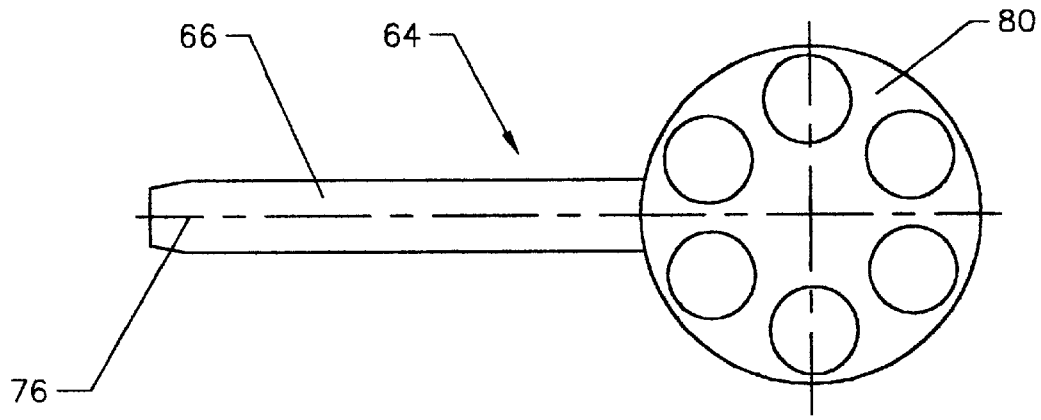

The valve cone 16 material is sufficiently resilient to form a liquid-tight seal across the valve seat 54, and at the cone opening 50 in the body 14. As shown in FIGS. 3 and 4, the plunger portion 60 of the cone 16 is positioned through the opening 50 and within the valve body 14. In this manner, the shield 62 abuts the outer surface 72 of the body 14, between the support mounts 48, and forms a seal with the body 14. As shown in FIGS. 9–11, the shield 62 has a contoured contacting surface, as indicated at 74, that is complementary to, engages and forms a seal with the outer surface 72.

Unlike known shields, the present shield 62 is positioned on the cone 16 at an angle relative to the lever arm 66. That is, the cone shield 62 defines a base angle a relative to a plane P that is perpendicular to a longitudinal axis, as indicated at 76, of the lever arm 66. The perpendicular plane P defines the position of the cone shield in known valves. In a preferred embodiment of the present valve 10, the base angle $\alpha$ is acute and is equal to ½ of the pivot angle $\beta$. That is, in an embodiment in which the cone 16 pivots about 20° between the opened and closed positions, the base angle $\alpha$ is about 10° or ½ of the pivot angle $\beta$.

It has been observed that in known valve arrangements, the shield portion of the cone tends to become damaged or cracks at about the region that the shield intersects the lever. This is the area that flexes to maintain a seal between the moving cone portion and the stationary valve body, and is thus under substantial stress when the valve is actuated and the cone pivots.

Given that the valve can cycle between the opened and closed positions up to about 60 times per minute, or about once per second, the cycling of flexure of the shield portion can be great, and fatigue failure of the material can occur. The present angled shield 62 reduces the opportunity for fatigue failure by reducing the amount that the shield 62 is flexed from it resting or static state. This is accomplished by flexing the shield 62 in both directions from its resting state. That is, rather than the flexing the shield 62 through a 20° angle in only one direction from its static or resting position, the angle of the shield 62 relative to the lever arm 66 is such that it travels only ½ of the total travel, or 10°, in each direction from its static position. Thus, although the shield 62 still travels the full 20° angle, the travel is only 10° in either direction from its static or resting position.

The cone support 64 is best seen in FIGS. 12A–12D, and is shown in position within the resilient portion 58, i.e, the plunger 60, a connecting sleeve 78 and the shield 62, in FIG. 11. The support 64 has a disk-like supporting element 80, and a central hub 82, from which the lever arm 66 extends. The lever arm 66, which can be formed of an electrically conductive material, such as steel, can include an opening 84 in an end thereof. In a current embodiment, the opening 84 is threaded to receive a leak detection element (not shown). The element is adapted to detect leaks by the presence of liquid completing an electrical circuit from the valve body 14, across the electrically insulative support 20 and cone portions 16, to the electrically conductive lever arm 66.

The shield 62 is not completely bonded to the lever arm 66. Rather, the shield 62 is mounted to the lever arm 66 such that at least a portion of the cone shield 62 and sleeve 78 are friction fit to the arm 66. In addition, as seen in FIG. 11, the cone shield 62 is mounted to the lever arm 66 to define a gap, as indicated at 86, between the shield 62 at about the juncture of the shield 62 and the arm 66. In a current embodiment, the gap 86 is formed by a countersunk region in the cone shield 62 that extends into the sleeve portion 78. The gap or countersunk region 86 defines a flexing region adjacent the juncture of the shield 62 and lever arm 66, that is co-radial with the shield 62. This configuration accommodates flexing of the shield 62 as the cone portion 16 pivots, and reduces the amount of compression of the shield 62 material adjacent the gap 86, as the valve 10 is pivoted between the opened and closed positions.

As provided above, the portions of the cone 16 that come into contact with the liquid food product must be maintained at high standards of cleanliness. While this is readily accomplished with the steel materials of the valve 10, it is more difficult with the resilient, non-metallic materials. In a present embodiment, the resilient portion 58 of the cone 16 is formed of a food grade, FDA approved silicone rubber. Such a material is non-electrically conducting; thus the cone portion 16 can be electrically insulated from the valve body 14. Although such a material is well suited for food handling and processing applications, it has limited sealing characteristics.

Silicone rubber has lesser elasticity than other, better suited sealing materials. To meet cleanliness standards and to accomplish good sealing characteristics, the cone portion 16 is formed with a sealing groove 88 that is configured to accommodate a sealing element, such as an O-ring 90, along a rear surface 92 of the shield 62. As will be described in more detail herein, the O-ring 90, which can be formed of, for example, EPDM (ethylene-propylene-diene-monomer, also known as ethylene-propylene rubber), NBR (nitrile-butadiene rubber, also known as acrylonitrile rubber) or the like, forms a seal between the shield 62 and the actuator support assembly 20. The O-ring 90 material is somewhat stiffer than the silicone rubber, and has a greater tendency to return to its relaxed or unstressed state than the silicone rubber material.

Figure 5:
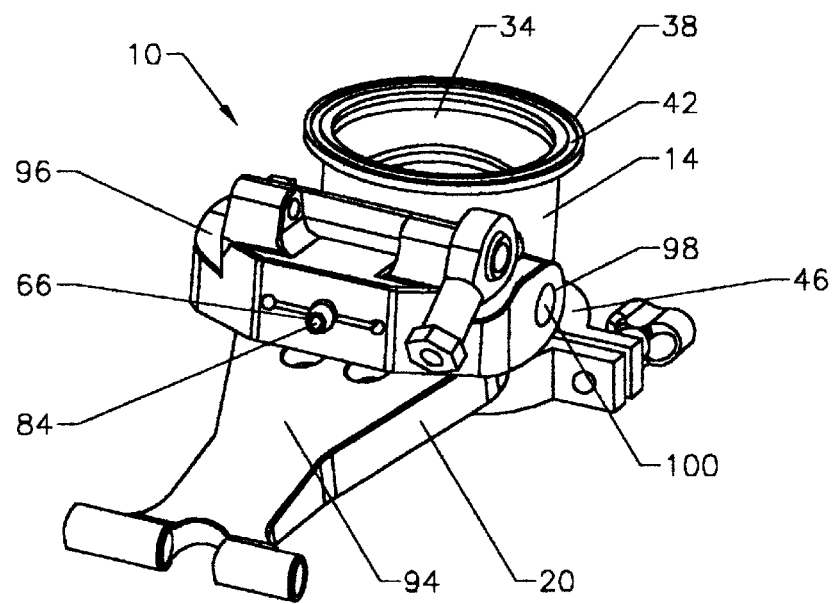
FIG. 5 is a rear perspective view of the UPV of FIG. 1, the valve being shown with the actuator support in place, and with the actuator components removed for clarity of illustration.
Figure 6:
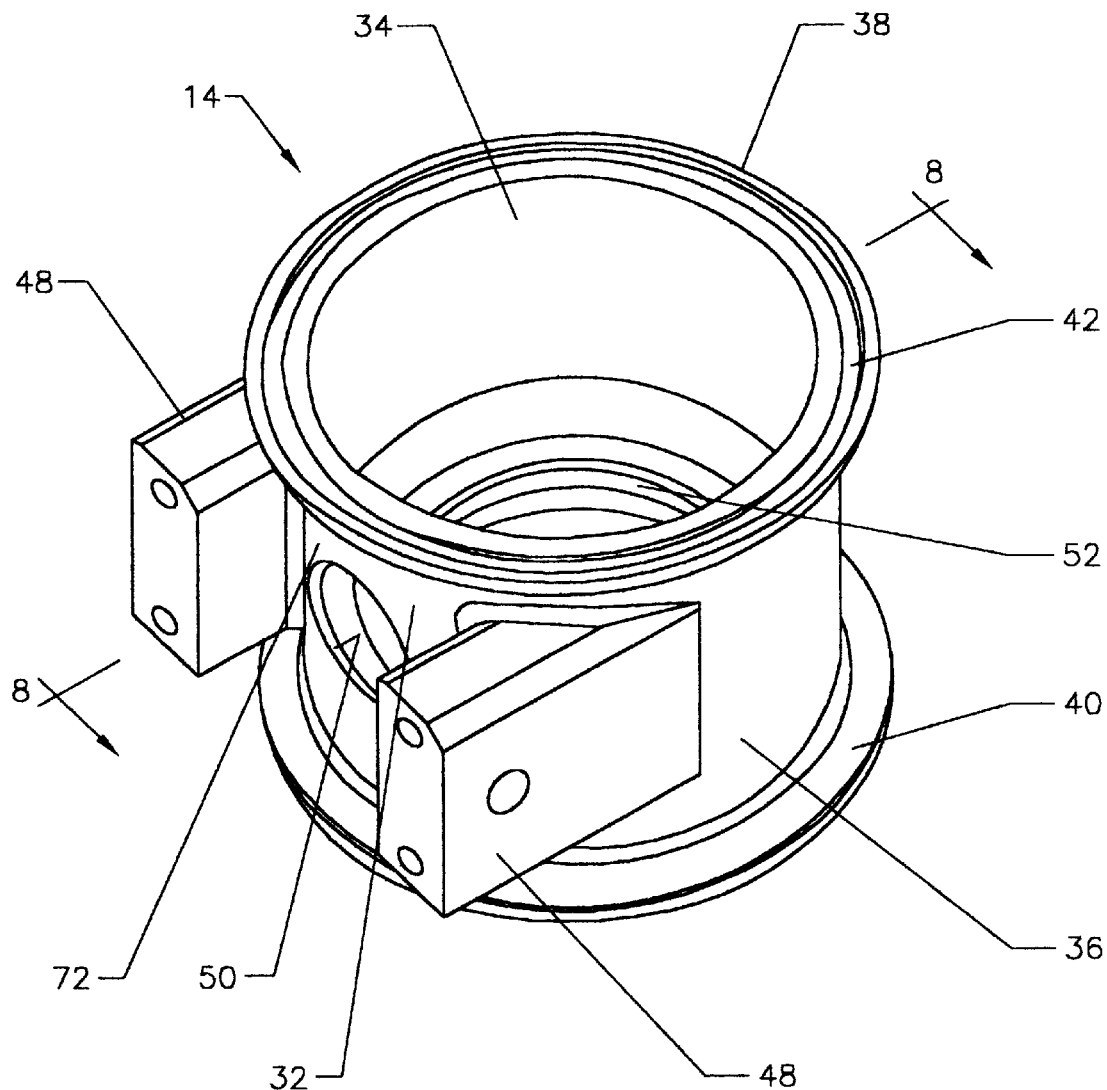
FIG. 6 is a perspective view of the UPV body.
Figure 7:
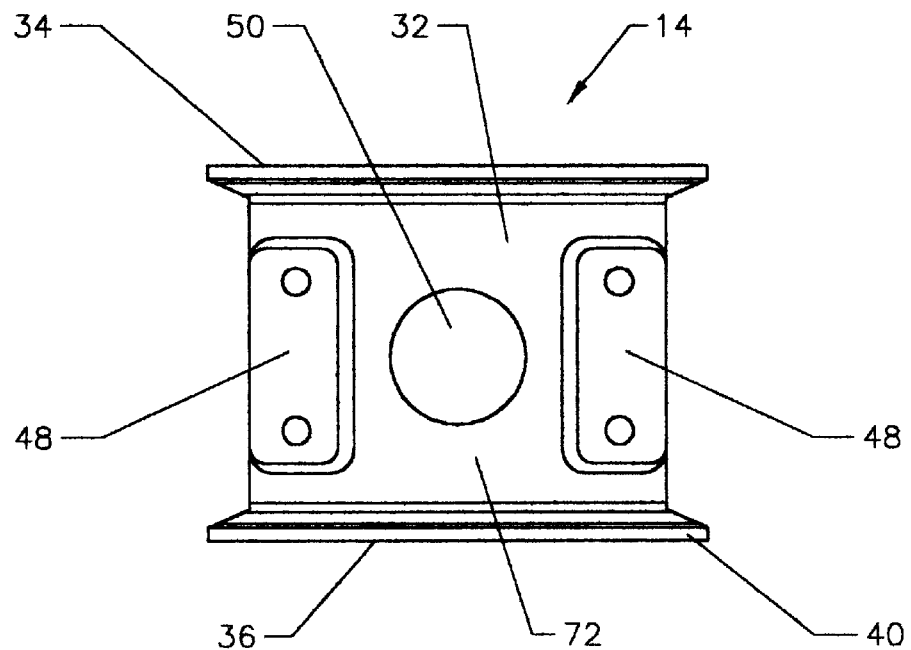
FIG. 7 is a rear view of the UPV body illustrated in FIG. 6.
Figure 8:
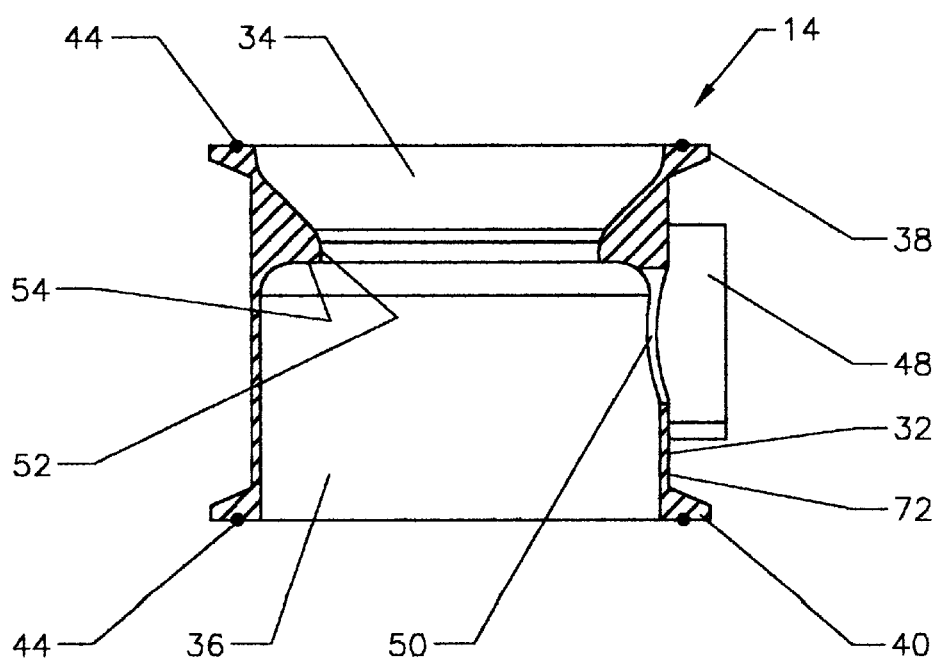
FIG. 8 is a cross-sectional view of the valve body taken along line 8—8 of FIG. 6.
Figure 13A:
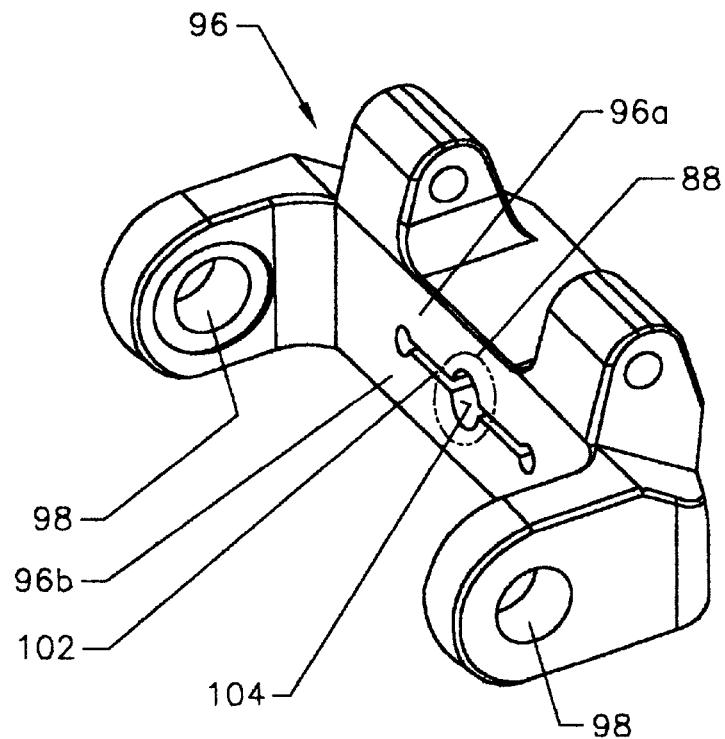
FIGS. 13A–13C illustrate the pivot block of the present UPV, FIG. 13C showing the block having a pair of molded-in nuts for clamping the lever arm to the block in an electrically insulated manner.
Figure 13B:
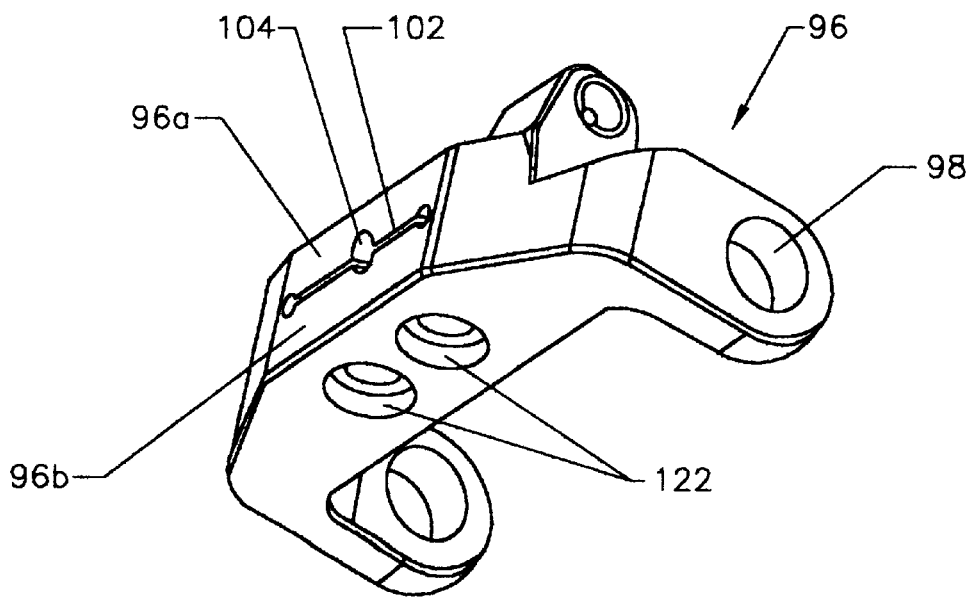
Figure 13C:
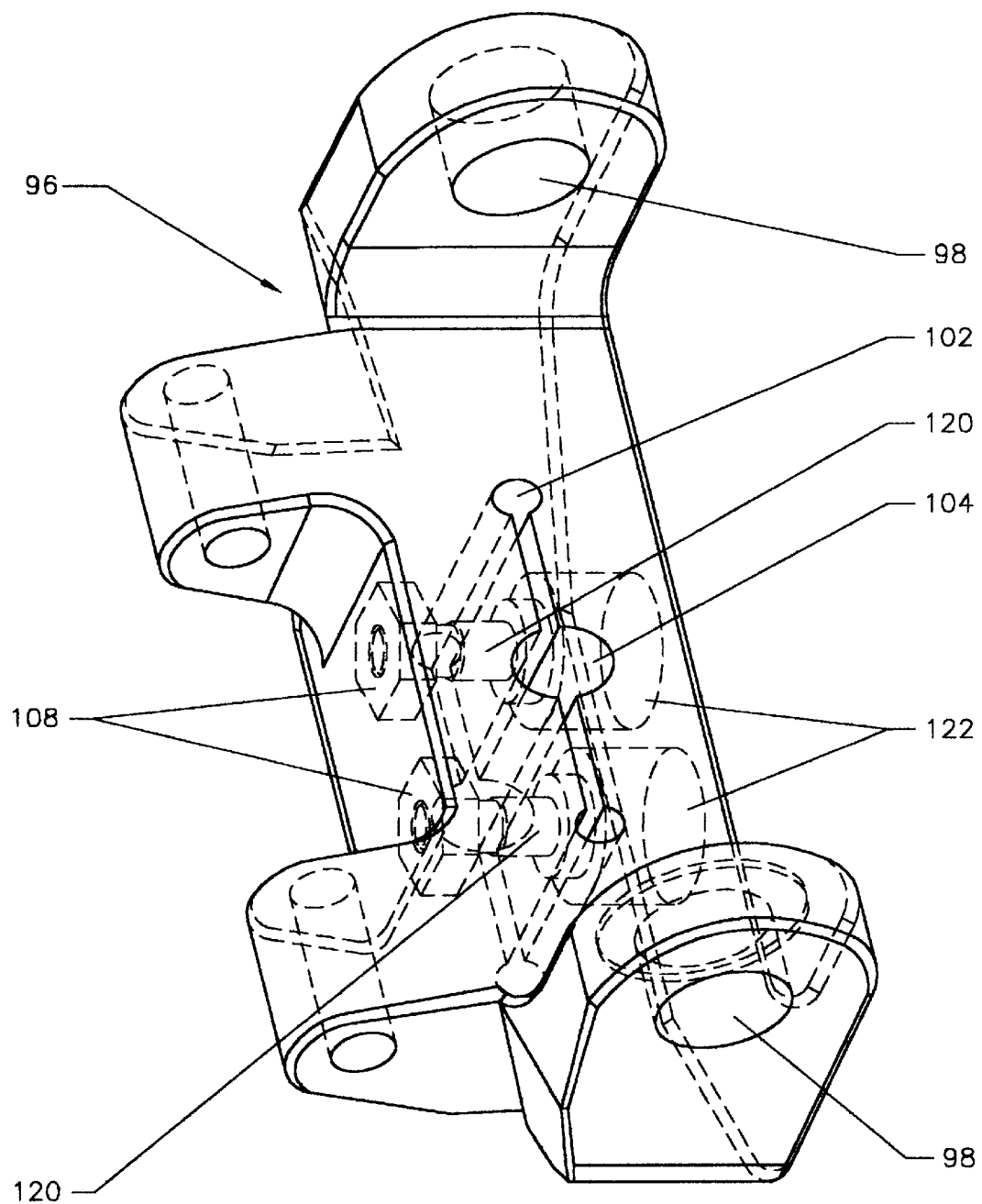

The actuator support assembly 20, which is shown in FIG. 5 without the actuator assembly 18, and which is shown, in part, in FIGS. 13A–13C, includes generally a carriage 94 and a pivot block 96. The carriage 94 is fixedly mounted to the valve body 14 at the support mounts 48. The pivot block 96 is pivotally mounted to the carriage 94 at a pair of sleeves 98 that are adapted to receive a pin 100 or like pivoting member.

The pivot block 96, which is illustrated in FIGS. 13A–13C, is molded from a plastic or resin-type material that is non-electrically conductive. The block 96 defines an open clamping slot 102 and a clamping bore 104 contiguous with the slot 102, that extend therethrough. The bore 104 is configured to receive the lever arm 66 when the valve 10 is assembled. When the lever arm 66 is positioned in the clamping bore 104, the O-ring seal 90 at the rear surface 92 of the shield 62 abuts and engages a groove 106 formed in the pivot block 96. In this manner, the cone portion 16 mounts to the pivot block 96 in a sealed and secured fashion.

The block 96 includes at least one and preferably a pair of molded-in nuts 108, as best seen in FIG. 13C. Each nut 108 provides a threaded opening 110 that can receive a bolt 112 for fixed clamping the lever arm 66 to the block 96. In the illustrated configuration, the lever arm 66 and the cone portion 16 pivot with the pivot block 96 relative to the valve body 14 and carriage 94 to open and close the valve 10.

Figure 14A:
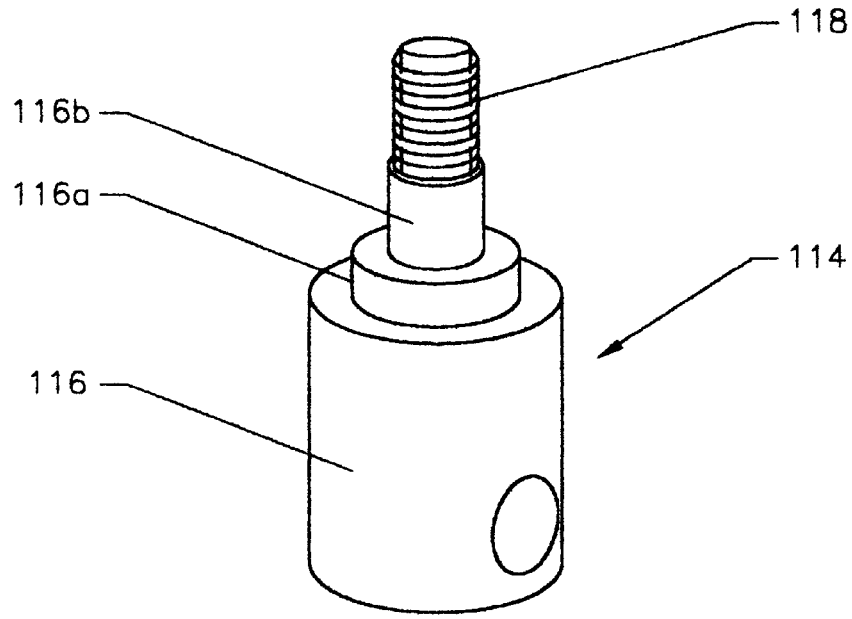
FIGS. 14A and 14B illustrated a tool for positioning the nuts in a mold to fabricate the pivot block having molded-in nuts.
Figure 14B:
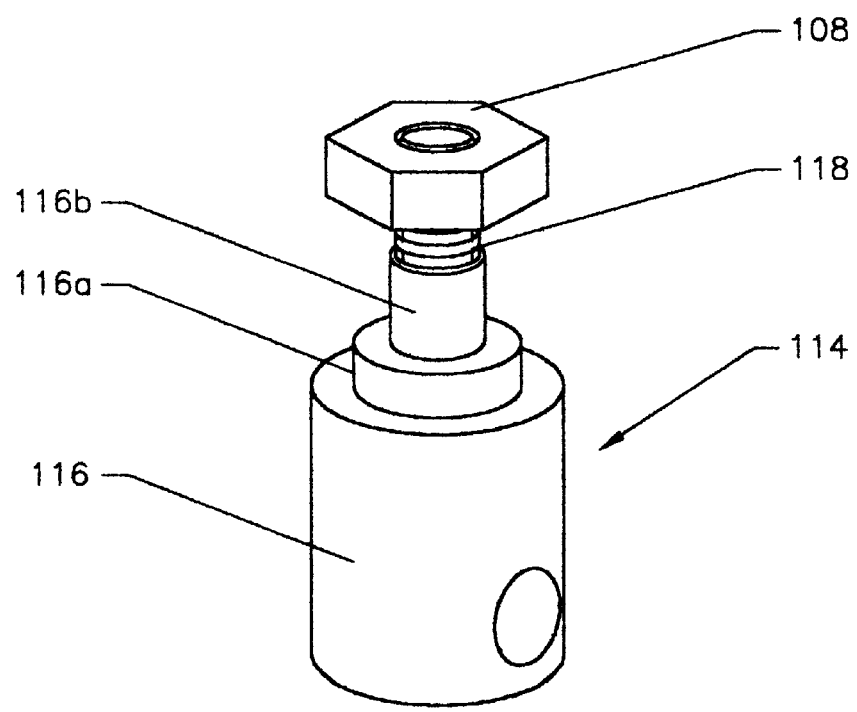

The molded-in nuts 108 are positioned in the block 94 during molding by use of a nut molding support 114. The molding support 114 is illustrated in FIGS. 14A and 14B. As is apparent from the drawings, the molding support 114 includes a body portion 116 having a plurality of decreasing diameter stepped regions or coaxial projections 116a,b. A threaded rod 118 extends from the center of the body 114 at the last projection 116b and engages and supports the nut 108 for the molding process. As the block 96 is formed around the nuts 108 and the molding support 114, threads are formed in the block 96 below the molded-in nuts 108, illustrated generally at 120. Molding the block 96 around the stepped regions 116a,b provides wells 122 in the pivot block 96 to receive the bolt heads 124.

When the bolts 112 are inserted into the threaded openings 120, they engage the nuts 108. As the bolts 112 are engaged with or threaded into the nuts 108, they apply a clamping force on the lever arm 66 by compression of the upper and lower portions of the block (as indicated at 96a and 96b, adjacent the clamping slot 102) with one another and with the lever arm 66. The threaded regions 120 formed in the molded block 96 provide sufficient resistance to turning to prevent the bolts 112 from loosening during operation. This arrangement retains the bolts 112 engaged with the nuts 108, which retains the lever arm 66 in place. The wells 122 permit the bolt heads 124 to be mounted flush with the block 96 surface.

Advantageously, the present arrangement permits the use of a common nut 108 to be molded into the block 96. This reduces the overall cost of the apparatus 12 because such common nuts 108 are relatively inexpensive and do not require extensive or specialized design or engineering efforts.

Figure 2:
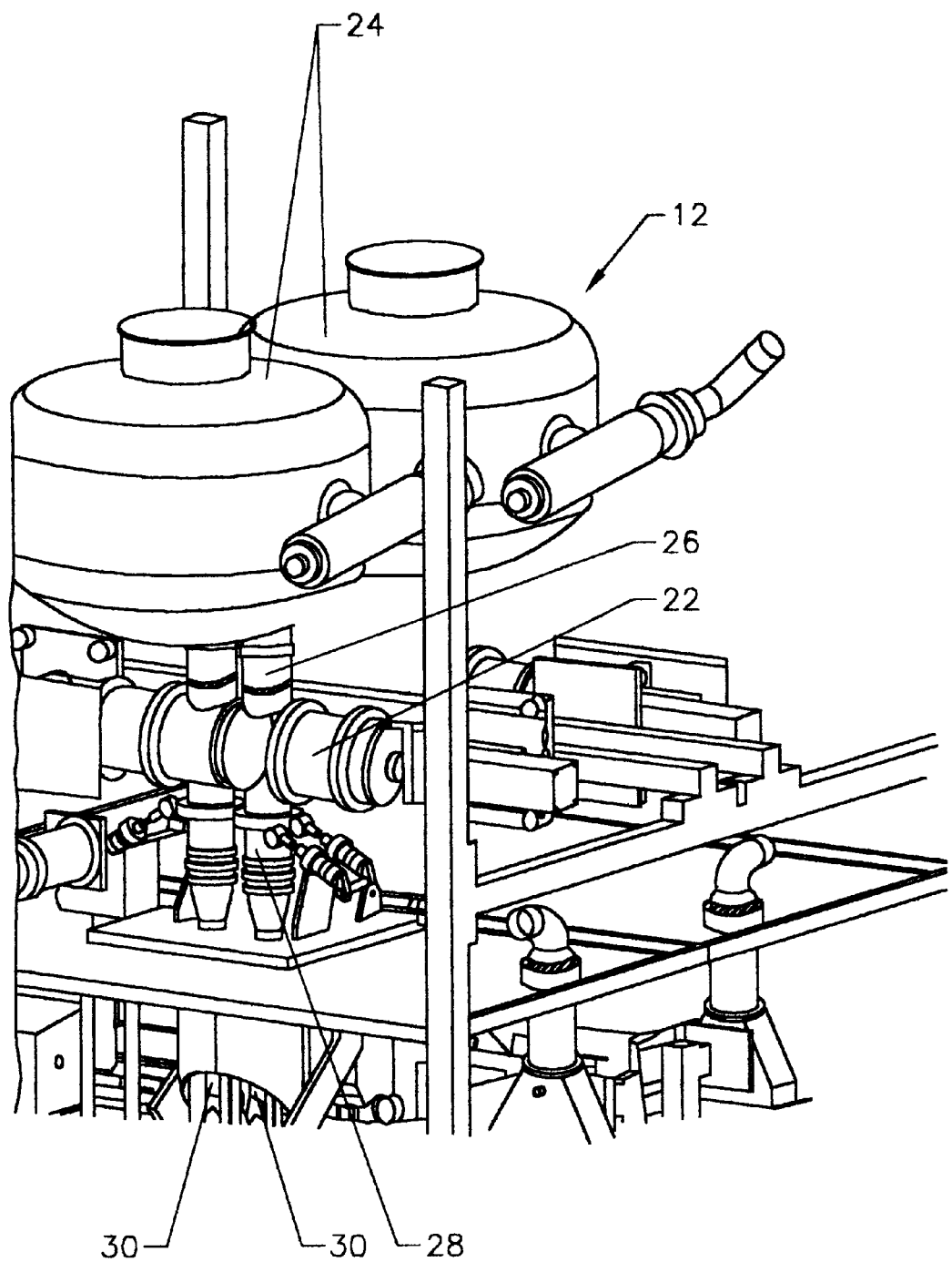
FIG. 2 is partial perspective view of a liquid filling apparatus having UPVs installed at various locations therein, the apparatus being illustrated to show one manner in which the valves can be installed.

The valve actuator assembly 18 is illustrated in FIGS. 1 and 3–4. In a present embodiment, the assembly 18 includes a pneumatic cylinder 126 having a shaft or rod 128 that extends from and retracts into the cylinder 126. The cylinder 126 is pivotally mounted at one end to the carriage 94. The shaft 128 is pivotally mounted at the other end of the actuator 18 to the pivot block 96. Referring to FIG. 4, as the cylinder 126 is actuated and the shaft 128 extends from the cylinder 126 in the direction as indicated by the arrow at 130, the block 96 pivots in the direction shown by the arrow at 132, which in turn opens the valve 10.

The actuator assembly 18 includes a biasing member, such as the illustrated coil spring 134 to bias the valve 10 into the closed position, as shown in FIG. 3. As the cylinder 126 is actuated, it acts against the force of the spring 134 to open the valve 10. The spring force returns the valve 10 to the closed position.

As provided above, in a preferred embodiment, the valve body 14 and the lever arm 66 are formed of an electrically conductive material, such as steel. The intervening parts, including the valve cone 16 and actuator support assembly 20 are formed of a non-conductive or insulative material. Thus, the valve body 14 is electrically insulated from the lever arm 66. It is contemplated that a leak detection system (not shown) can be incorporated into the valve 10 to detect whether a leak has occurred in the apparatus 12 around the valve 10. Specifically, an element (not shown) can be positioned in the threaded opening 84 in the lever arm 66 to form part of an electrical circuit that includes the valve body 14 and the lever arm 66. The circuit is otherwise incomplete because of the insulative nature of the intervening components, namely, the actuator support 20 and the valve cone 16.

In the event that a leak occurs, as liquid flows, for example, from the valve body 14 across the valve cone 16 and support 20, to the lever arm 66, the circuit is completed by the conductive liquid. An indicator or monitor (not shown) can be provided in the circuit to indicate that the circuit has been completed by the liquid, which in turn correlates to a leak in the apparatus 12 at the valve 10.

Surprisingly, the present valve 10 has been found to provide a significantly increased flow area across the valve 10 and particularly across the valve throat 52, compared to known filling apparatus valves. Those skilled in the art will recognize that often, the valve throat can be the area of highest flow resistance in the valve. Flow resistance can decrease the amount of product or reduce the flow rate of product through the valve at a given or fixed upstream or filling pump 22 pressure. This increased flow resistance can become the limiting factor in apparatus 12 design or operation.

It has been observed that the present in-line valve provides a surprisingly high flow area across the valve throat 52, which correlates to a decreased flow resistance. In a current embodiment in which the filling apparatus 12 has a 70 millimeter (mm) filling tube 30 (which correlates to a 45 mm diameter filling tube 30), the filling tube 30 area is about 1625 mm$^2$. The flow area across the valve throat 52, with a plunger 60 diameter of 54.0 mm is about 2150 mm$^2$ when the cone 16 is pivoted to a 20° open position. It will be apparent from the figures that the flow area increases commensurately with increased valve 10 open position (i.e., increased valve pivot angle). For example, at a 21° pivot angle β the area is about 2178 mm$^2$, at a 22° pivot angle β the area is about 2205 mm$^2$, at a 23° pivot angle β the area is about 2233 mm$^2$, at a 24° pivot angle β the area is about 2263 mm$^2$, and at a 25° pivot angle β the area is about 2293 mm$^2$.

Interestingly, the flow area opens significantly upon slight opening of the valve 10. That is, at a 0° pivot angle β (the closed position) the area is 0 mm$^2$, while a 1° pivot angle β provides an area of about 1884 mm$^2$. At a 2° pivot angle β the area increases to about 1886 mm$^2$; at a 3° pivot angle β the area is about 1890 mm$^2$, at a 4° pivot angle β the area is about 1895 mm$^2$, and at a 5° pivot angle β the area is about 1901 mm$^2$.

In addition, it has been found that the filling velocity profile provides for rapid filling by the apparatus 12. In an apparatus 12 having a three inch (3") valve, the maximum velocity has been observed to be about 870 millimeters per second (mm/sec), which is achieved within about 0.36 seconds of the valve 10 opening. The velocity has been observed to reach about 800 mm/sec at about 0.18 second after opening.

Thus, high velocities are achieved rapidly, with the velocity reaching about 92 percent of maximum within 0.18 seconds. In a typical apparatus 12 having a cycle time of about 0.9 seconds, the time to reach the full opened and full closed positions is about 0.325 second, and the actual time that the valve 10 is in the full opened position is about 0.350 seconds. Thus, the liquid velocity reaches the maximum almost coincidental with the time required to reach the full open position. The rapid fill capabilities of the present valve 10 are thus well suited for rapid filling apparatus 12 operation.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. An in-line, lever actuated valve comprising:

a valve body having an outer surface and defining an inlet region, an outlet region and a flow chamber intermediate the inlet and outlet regions, the valve body defining a cone opening therein intermediate the inlet and outlet regions;

a pivotable cone member having a plunger, a lever arm and a cone shield intermediate the plunger and lever arm, at least a portion of the cone member traversing through the cone opening and positioned within the flow chamber such that the cone shield engages the outer surface of the valve body to form a seal therewith, the cone member being pivotable through a predetermined angle between an opened position and a closed position wherein the plunger forms a seal across the flow chamber;

an actuator and an actuator support, the actuator support being fixedly mounted to the valve body, the actuator being operably connected to the cone member to pivot the cone member between the opened and closed positions; and a pivot block pivotally mounted to the actuator support, the pivot block defining a clamping bore therein for receiving the lever arm and clamping the lever arm thereto.

2. The in-line valve in accordance with claim 1 wherein the cone member is formed of a resilient material.

3. The in-line valve in accordance with claim 2 wherein the resilient material is silicone rubber.

4. The in-line valve in accordance with claim 1 wherein the cone shield and plunger are integral with one another.

5. The in-line valve in accordance with claim 4 including a sleeve portion extending between the plunger and the cone shield, wherein the sleeve portion is positioned in the cone opening.

6. The in-line valve in accordance with claim 1 wherein the lever arm defines a longitudinal axis, and wherein the cone shield is positioned about the lever arm so as to define a base angle relative to a plane that is perpendicular to the longitudinal axis.

7. The in-line valve in accordance with claim 6 wherein the base angle is acute.

8. The in-line valve in accordance with claim 1 wherein the valve cone is pivotable through an angle of about 1° to about 25° from the closed position to the opened position.

9. The in-line valve in accordance with claim 6 wherein the valve cone is pivotable through an angle of about 1° to about 25° from the closed position to the opened position, and wherein the cone shield is positioned on the lever so as to define a base angle that is about one-half of the angle that the valve cone pivots from the closed position to the opened position.

10. The in-line valve in accordance with claim 9 wherein the cone is pivotable about 20° from the closed position to the opened position, and the cone shield is positioned on the lever arm so as to define a base angle of about 10°.

11. The in-line valve in accordance with claim 1 wherein the pivot block is formed of a molded material and wherein the pivot block includes at least one molded-in nut, the nut being adapted to receive a bolt therein for securing the lever arm in the pivot block.

12. The in-line valve in accordance with claim 1 wherein the pivot block is adapted to abut against the cone shield to maintain the cone shield in engagement with the valve body.

13. The in-line valve in accordance with claim 12 including sealing means for forming a seal between the cone shield and the pivot block.

14. The in-line valve in accordance with claim 13 wherein the sealing means includes an O-ring positioned on a surface of the cone shield in abutting relation to the pivot block.

15. The in-line valve in accordance with claim 1 wherein the plunger includes a sealing surface.

16. The in-line valve in accordance with claim 2 wherein the cone member is mounted to the lever arm so as to define a gap between the cone shield and the lever arm at about a region coplanar with an intersection of the cone shield and the lever arm, the gap being adapted to accommodate a portion of the cone shield as the cone shield flexes when the cone member is pivoted between the opened and closed positions.

17. The in-line valve in accordance with claim 16 wherein the gap is formed by a countersunk region.

18. A valve cone for pivotally mounting to an associated valve body, the valve body having an inlet and outlet regions and a flow chamber intermediate the inlet and outlet regions, the valve body further defining an outer surface and a cone penetration, the valve cone comprising:

a cone support having a lever arm extending therefrom, the lever arm defining a longitudinal axis;

a sleeve portion extending between and integral with the plunger and the cone shield, the juncture of the cone shield and sleeve portion having a countersunk region; and a resilient portion including a plunger positioned over the cone support and a cone shield integral with the plunger, the resilient portion being positioned over at least a portion of the lever arm, the cone shield being positioned so as to define a base angle relative to a plane perpendicular to the lever arm longitudinal axis;

wherein the plunger is positionable within the flow chamber with the cone shield in engagement with the valve body, the plunger being pivotable between an opened valve position and a closed valve position forming a seal across the flow chamber.

19. The valve cone in accordance with claim 18 wherein the base angle is between about 1° and about 12.5°.

20. The valve cone in accordance with claim 19 wherein the base angle is about 10°.

21. The valve cone in accordance with claim 18 wherein the cone shield includes a surface engageable with the outer surface of the valve body and is complementary therewith to form a seal therebetween.

22. A liquid filling apparatus for filling a series of containers, the liquid filling apparatus comprising:

a liquid reservoir;

a fill pump in flow communication with the liquid reservoir, the fill pump having an inlet and an outlet;

a filling tube connected to the pump at one end, the filling tube having a nozzle attached thereto at an end opposite the pump;

an in-line lever actuated valve including an actuator and actuator support fixedly mounted to the in-line lever actuated valve, the actuator operably connected to a pivotable cone member to pivot the cone member between opened and closed positions, the pivotable cone member having a plunger, a lever arm and a cone shield intermediate the plunger and lever arm, the lever arm connected to a pivot block mounted to the actuator support, at least a portion of the cone member traversing through a cone opening and positioned within a flow chamber of the in-line lever actuated valve such that the cone shield engages the outer surface of the in-line lever actuated valve to form a seal therewith, the cone member being pivotable through a predetermined angle between the opened position and a closed position wherein the plunger forms a seal across the flow chamber.

23. The liquid filling apparatus according to claim 22 wherein the in-line lever actuated valve is disposed at the inlet of the fill pump.

24. The liquid filling apparatus according to claim 22 wherein the in-line lever actuated valve is disposed at the outlet of the fill pump.

* * * * *